July 26, 1927.

A. SCHOPPER

TESTING OF MECHANICAL STRENGTH

Filed Dec. 2, 1925

1,637,011

Inventor:
Alfred Schopper
by
Atty.

Patented July 26, 1927.

1,637,011

UNITED STATES PATENT OFFICE.

ALFRED SCHOPPER, OF LEIPZIG, GERMANY.

TESTING OF MECHANICAL STRENGTH.

Application filed December 2, 1925, Serial No. 72,733, and in Germany April 12, 1924.

My invention refers to the testing of the mechanical strength of metals and other materials and its particular object is to provide means whereby such tests can be effected in a particularly simple and efficient manner.

According to the present invention the mechanical strength exerted on the test piece is ascertained by measuring the variation in shape of a test member, brought about by the force acting on it. According to this invention the same means can be employed for testing by tension, pressure and bending.

According to this invention the test piece is caused to create a bending moment in a straight elastic rod supported in two points, the bending of the rod, which is hereby brought about, being registered in or near the middle between the two points of support.

Figure 3:
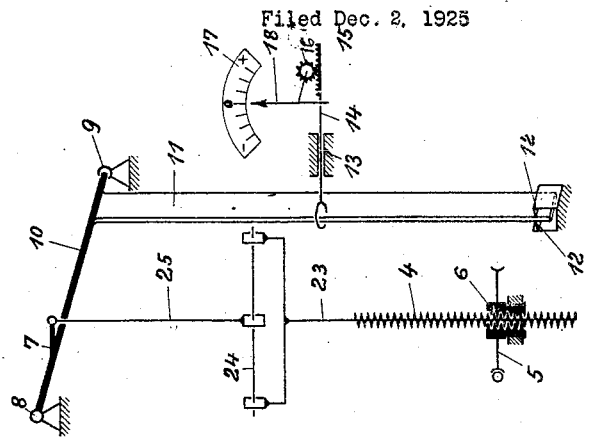
Figure 2:
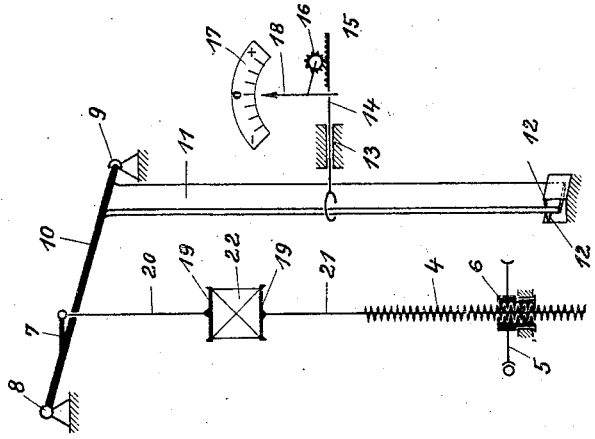
Figure 1:
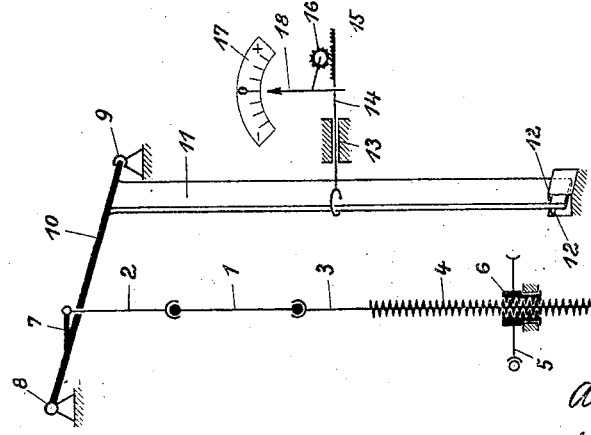

In the drawings affixed to this specification and forming part thereof a device embodying my invention is illustrated diagrammatically by way of example, as adapted to the testing of tensional, pressure and bending strength, respectively, Fig. 1 being a diagram illustrating the device as used for the testing of tensional stress, while Fig. 2 is a similar view showing the application to a pressure test, and Fig. 3 illustrating a modification, wherein the test piece is tested for bending stress.

Referring first to Fig. 1, 1 is the rod-shaped test piece and 2 and 3 are tension rods gripping the ends of the test piece 1. The rod 3 is connected with a screw spindle 4 extending across a nut 6 which can be turned by a lever 5. The tension rod 2 is suspended from an arm 7 acting on an intermediate bar 10 mounted in bearings 8 and 9 and which is rigidly connected with one end of an elastic ruler-shaped member 11, the other end of which is inserted between two knife edges 12, 12 in such manner that the member 11 is free to move in the longitudinal direction. Intermediate the two ends a rod 14 partly embraces the member 11, this rod being connected with a rack 15 acting on a gear wheel 16, which is pivotally connected with a pointer 18 moving in front of a graduated scale member 17.

The tensional force exerted by the threaded spindle 4 and acting on the test piece 1 causes the arm 7 to be moved angularly and the member 11 to be bent. The deflection of this member at the point where the rod 14 is attached, is transmitted by the rack 15 and gear wheel 16 onto the pointer 18 and can be read off at the graduated scale member 17.

In the modification illustrated in Fig. 2, the arrangement of parts is substantially the same, however the tension rods 2 and 3 are here replaced by two pressure bars 20, 21 which hold between them the test piece 22 having the form of a block. The pressure acting on this test piece is again transmitted by the arm 7 and bar 10 onto the member 11 and the pointer 18.

In the modification illustrated in Fig. 3 the test piece 24 is a horizontally suspended rod carried by a forked tension rod 23 and acted upon in its middle by a tension rod 25.

Preferably the knife edges 12 are arranged to be adjusted relatively to each other in order to allow varying their distance.

I wish it to be understood that I do not desire to be limited to the exact details of construction shown and described for obvious modifications will occur to a person skilled in the art.

I claim:—

Testing device comprising test piece straining means, an elastic rod-shaped member, one end of said member being secured against longitudinal motion, the other end being free to move longitudinally, means for securing said other end against movement in a transverse direction, means adapted to transmit power from said straining means onto a point near the first mentioned end of said member in such manner as to exert a bending action on said point and registering means connected with said member substantially midway between the ends of said member.

In testimony whereof I affix my signature.

ALFRED SCHOPPER.